Aug. 31, 1948.　　　W. F. SCHAETZLY　　　2,448,395
SWING JOINT
Filed March 12, 1946
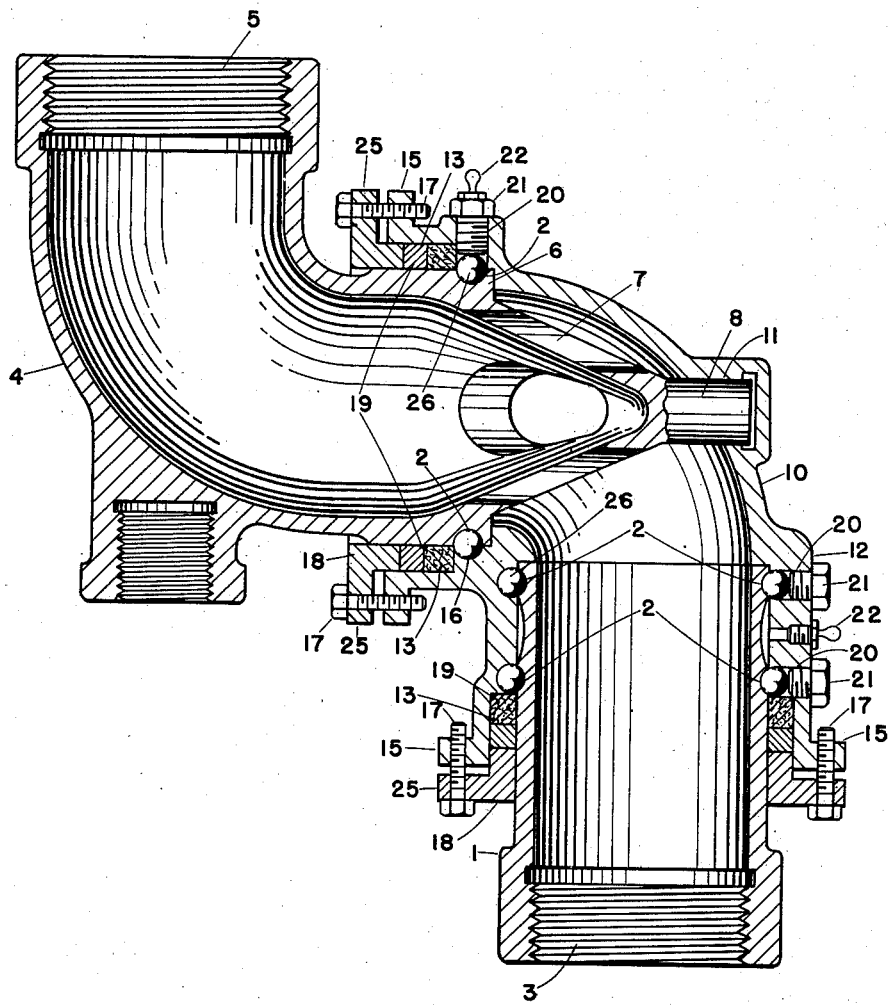
W. F. SCHAETZLY
Inventor
By Mason Fenwick & Lawrence
Attorneys Patented Aug. 31, 1948

2,448,395

UNITED STATES PATENT OFFICE 2,448,395

SWING JOINT

William F. Schaetzly, Louisville, Ky.

Application March 12, 1946, Serial No. 653,828

1 Claim. (Cl. 285—97.3)

This invention relates to swing joints and more particularly to a device of this character intended to connect systems of piping to permit the rotation of one section with respect to the other.

An object of the invention is to provide an improved swing joint of improved simplicity in construction and distributing the strains in such manner as to provide for long life and a satisfactory operation of the device.

The invention consists in the novel construction, arrangement, and combinations of parts hereinafter more particularly described and claimed.

One sheet of drawings accompanies this specification as part thereof in which like reference characters indicate like parts throughout.

The drawing represents a medial cross section taken through the improved joint.

In accordance with the present invention the improved joint comprises three sections—an end cylindrical section; an end elbow section; and a medial elbow section.

The end cylindrical section 1 is formed as a tube and has the outer end of its bore threaded as at 3 to associate the joint with a pipe, or pipes, and has its main cylindrical portion provided with spaced outwardly opening annular ball races 2—2.

The elbow end section 4 has the outer end of its bore threaded as at 5 to connect the joint with another pipe system and has its inner end 6 formed with an outer cylindrical face similarly provided with an outwardly opening annular ball race 2. This elbow end section has its inner end continued in the form of a conical spider 7, the extreme end of which is formed as a spindle 8 adapted to seat in a bearing bore 11 formed in the bend portion of the medial elbow section 10.

The medial elbow section has its end portions provided with cylindrical bores adapted to provide seats for the cylindrical end section 1 and the cylindrical end portion 6 of the elbow end section 4, these cylindrical bores of the medial section 10 being provided with inwardly opening ball races 16 complementary to the outwardly opening ball races 2 of the end sections.

The medial section 10 is further provided with radially disposed bores 20, one of such bores communicating with each of the ball races and of sufficient size to permit the insertion of the balls through such bores and closure plugs 21 are provided for these openings and these plugs 21 may be provided with lubricating devices 22 if desired for introducing a lubricant to the ball races.

Each end of the medal section 10 is provided with an enlarged bore 13 adapted to receive packing rings 19 which are held in position by means of a closure ring 18 having outwardly directed lugs 25. Similar outwardly directed lugs 15 are formed on the ends of the medial section 10 and bolts 17 pass through suitable threaded orifices in these lugs 15 to draw the locking rings 18 against the packing rings 19 to assure a tight joint.

It will be noted that when assembled the balls 26 in the ball races will not only provide anti-friction bearings for the sections but will also function to interlock the sections in assembled relationship. It will also be noted that a substantial part of the strain on the joint will be carried by the pinion stud 8 with its direct bearing in the wall of the medial section 10.

Various modifications in the configuration of the parts will readily suggest themselves to those skilled in the art but within the scope of the invention as claimed.

Having thus fully described my invention, I claim:

Swivel joint comprising three tubular sections, the medial section formed as an elbow with cylindrical bores at each end, each end cylindrical bore struck on two concentric diameters, that portion struck on the shorter diameter being the innermost at each end and formed with an inwardly directed ball race, the end sections each formed with cylindrical end portions of a diameter to snugly fit the innermost portions of the end bores of the medial section and of a length greater than the bores at each end of the medial section, said end cylindrical portions of the end sections formed with outwardly directed ball races complementary to the races in the medial section, balls disposed in said raceways interlocking the sections, packing rings disposed between the cylindrical ends of the end sections and the end cylindrical bores of the medial section having the greater diameter outwardly with respect to the ball races, closure rings having a sliding fit on the end cylindrical portions of the end sections and arranged to bear against the packing rings, and means for drawing the closure rings toward the ball races, to compress the packing rings.

WILLIAM F. SCHAETZLY.

REFERENCES CITED

The following references are of record in the file of this patent:

UNITED STATES PATENTS

| Number | Name | Date |
|---|---|---|
| 388,112 | Bodycomb | Aug. 21, 1888 |
| 492,619 | Bailey | Feb. 28, 1893 |
| 991,501 | Graves | May 9, 1911 |
| 1,178,999 | Fleming | Apr. 11, 1916 |
| 1,558,592 | Chester | Oct. 27, 1925 |
| 2,312,341 | King | Mar. 2, 1943 |
| 2,382,375 | Allen et al. | Aug. 14, 1945 |